Figure 1:
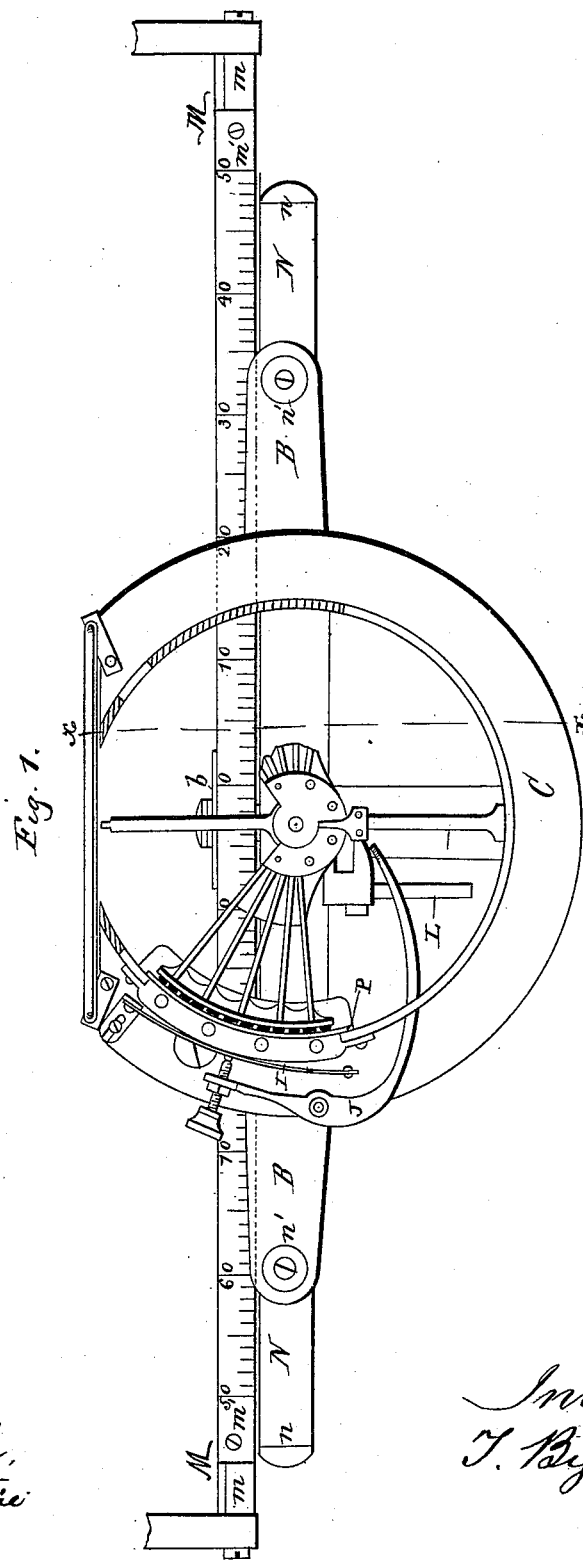

(No Model.) 2 Sheets—Sheet 1.

T. BIGELOW.
TYPE WRITING MACHINE.

No. 471,093. Patented Mar. 22, 1892.

Witnesses:
John Buckle,
O. E. Valentine

Inventor:
T. Bigelow

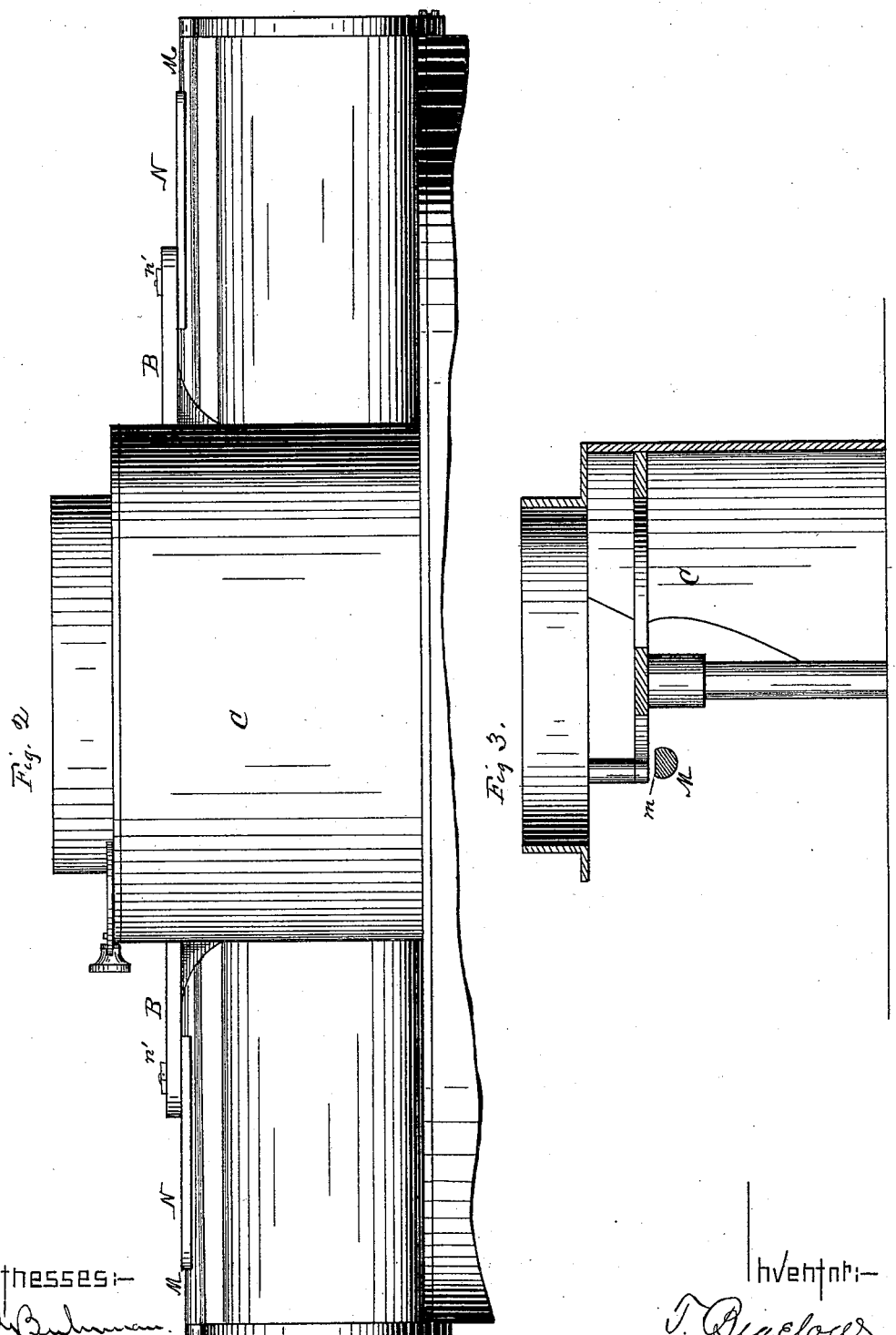

UNITED STATES PATENT OFFICE.

TIMOTHY BIGELOW, OF BROOKLYN, NEW YORK.

TYPE-WRITING MACHINE.

SPECIFICATION forming part of Letters Patent No. 471,093, dated March 22, 1892.

Application filed November 28, 1888. Renewed November 21, 1891. Serial No. 412,595. (No model.)

*To all whom it may concern:*

Be it known that I, TIMOTHY BIGELOW, of the city of Brooklyn and State of New York, have invented a new and useful Improvement in Type-Writing Machines; and I do hereby declare that the following specification, taken in connection with the drawings annexed to and forming part of the same, furnishes a full and clear description of the invention sufficient to enable those skilled in the art to which it pertains to make and operate the same.

My invention relates to type-writing machines, and has for its object the provision and adjustment of the scale which designates the number of spaces traversed by the paper-carriage, so as to be more readily seen.

The invention is applicable to the style of type-writing machines known as the "Hammond," an example of which may be seen in the specification and drawings of Letters Patent No. 290,419, dated December 18, 1883, and is intended for use with an inking device set forth in application for patent made by me on the 21st day of November, 1887, Serial No. 255,697, in which the inking-ribbons of the Hammond type-writer are dispensed with.

The following detailed description will more fully explain the nature and purpose of my invention, which is illustrated in the accompanying drawings, showing what I consider the best means for carrying my invention into practice.

Only so much of the mechanism of the typewriter is shown in the drawings as is necessary to enable one acquainted with said machine to understand and apply my invention.

Figure 1 is a plan view of my improved scale, showing its application to the type-writing machine. Fig. 2 is a front elevation of the same. Fig. 3 is a transverse vertical section on line X X, Fig. 1, looking toward the right.

C represents the type-wheel guard, and B the bracket which steadies the vertical shaft of the ribbon attachment in a type-writing machine of the description referred to.

M is the guide-rod of the paper-carriage, which preferably has a flattened surface $m$ on the top, on which the scale $m'$ is marked.

N is an extension-arm, which carries an index-line $n$. Arm N is attached to bracket B at $n'$. The guide-rod M is attached to and moves with the paper-carriage in the same manner as the part 73 of Patent No. 290,419, referred to.

The scale is numbered in both directions from the center, so that it may be read from either end, and when the carriage is pushed to the right and the scale on the left thereof is hidden behind the type-wheel case or cylinder the scale on the right will indicate in connection with the index $n$ the margin allowed or desired, and when the carriage has moved to the left a margin on the right side of the paper can also be measured by the scale and index on the left of the cylinder. In many other ways the scale and indices will be found useful.

The inking device which forms the subject-matter of my application above referred to consists, essentially, of a pad P, supported on a spring I and pressed upon by a lever J, operated from the driving-lever L; but it will be understood that the present invention may be used with a machine of the style having the inking-ribbon, though not with so good an effect.

Having thus described my invention, what I claim, and desire to secure by Letters Patent, is—

In a type-writing machine of the kind described, the combination, with the paper-carriage, guide-rod carried by said carriage and having a flattened surface, and a scale carried thereon, of a bracket B and extension-arm N, secured thereto and having an index $n$ thereon, substantially as set forth.

T. BIGELOW.

Witnesses:
 B. E. VALENTINE,
 OTTO NELSON.